(12) United States Patent
Tatsubori et al.

(10) Patent No.: US 8,516,361 B2
(45) Date of Patent: Aug. 20, 2013

(54) OFFLOADING FILLING OF TEMPLATE PARAMETERS TO CLIENT FROM SERVER

(75) Inventors: Michiaki Tatsubori, Kanagawa-ken (JP); Toyotaro Suzumura, Tokyo (JP); Tamiya Onodera, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 12/334,491

(22) Filed: Dec. 14, 2008

(65) Prior Publication Data
US 2010/0153484 A1 Jun. 17, 2010

(51) Int. Cl.
*G06F 17/00* (2006.01)
*G06F 15/16* (2006.01)

(52) U.S. Cl.
USPC ............... 715/235; 715/234; 709/203

(58) Field of Classification Search
USPC .................. 715/235, 234; 709/203
See application file for complete search history.

(56) References Cited

U.S. PATENT DOCUMENTS

| | | | |
|---|---|---|---|
| 6,769,094 B2* | 7/2004 | Loesch et al. | 715/234 |
| 6,950,850 B1* | 9/2005 | Leff et al. | 709/203 |
| 7,117,436 B1 | 10/2006 | O'Rourke et al. | |
| 7,139,774 B2* | 11/2006 | Dettinger et al. | 1/1 |
| 7,178,101 B2 | 2/2007 | Tunning | |
| 2006/0230343 A1* | 10/2006 | Armandpour et al. | 715/517 |
| 2008/0162490 A1* | 7/2008 | Becker et al. | 707/10 |
| 2008/0281944 A1* | 11/2008 | Vorne et al. | 709/218 |

OTHER PUBLICATIONS

IEEE; IEEE 100—The Authoritative Dictionary of IEEE Standard Terms; 2000; Standards Information Network/IEEE Press; Seventh Edition; pp. 176, 1031.*
Leff et al; Web-Application Development Using the Model/View/Controller Design Pattern; Sep. 4-7, 2001; IEEE Computer Society; Proceedings of EDOC 2001, 5th International Enterprise Distributed Object Computing Conference; pp. 118-127.*
IBM; Client Side Tag Library Framework for Web2.0; Jan. 24, 2008; ip.com Prior Art Database; pp. 0-17. Retrieved from http://www.ip.com/pubview/IPCOM000166809D.*

(Continued)

*Primary Examiner* — Chau Nguyen
(74) *Attorney, Agent, or Firm* — Vazken Alexanian

(57) ABSTRACT

One or more servers are communicatively connected to a client. An application program and a dummy template engine run on the servers. The dummy template engine substitutes an original template engine that can run on the servers. The original template engine is normally used by the application program to fill parameters of a template at the servers. The dummy template engine has the same interface as the original template has, such that the application program accesses the dummy template engine no differently than it accesses the original template engine. The dummy template engine is thus accessed by the application program in lieu of the original template engine. The dummy template engine causes the parameters of the template to be filled at the client instead of at the servers, such that template parameter filling is offloaded to the client.

11 Claims, 12 Drawing Sheets

(56) References Cited

OTHER PUBLICATIONS

Tatsubori et al; HTML Templates that Fly—A Template Engine Approach to Automated Offloading from Server to Client; Apr. 20-24, 2009; ACM; WWW 2009: Proceedings of the 16th international conference on World Wide Web; pp. 951-960.*

Benson et al; Sync Kit: A Persistent Client-side Database Caching Toolkit for Data Intensive Websites; Apr. 26-30, 2010; ACM; WWW 2010: Proceedings of the 19th international conference on World Wide Web; pp. 121-130.*

Yang et al; Hilda: A High-Level Language for Data-Driven Web Applications; 2006; IEEE Computer Society; ICDE '06 Proceedings of the 22nd International Conference on Data Engineering; p. 32.*

Gerner et al; Automatic Client—Server Partitioning of Data-Driven Web Applications; Jun. 27-29, 2006; ACM; Proceedings of the 2006 ACM SIGMOD international conference on Management of data; pp. 760-762.*

Chong et al; Secure Web Applications via Automatic Partitioning; Oct. 14-17, 2007; ACM; SOSP '07: Proceedings of twenty-first ACM SIGOPS syposium on Operating systems principles; pp. 31-44.*

Cooper et al; Links: Web Programming Without Tiers; Nov. 2006; Springer-Verlag; Proceedings on 5th International Symposium on Formal Methods for Components and Objects; pp. 266-296.*

F. Yang et al., "A unified platform for data driven web applications with automatic client-server partitioning," WWW 2007, May 8-12, 2007, Banff, Alberta, Canada.

"Google web toolkit," http://code.google.com/webtoolkit/overview.html, copyright 2008.

Y. Kats, "JSF and Ajax: web 2.0 application made easy with Rational Application Developer V7," http://www.ibm.com/developerworks/rational/library/06/1205_kats_rad2/, Dec. 5, 2006.

* cited by examiner

```
check_login();
$smarty=new SmartyBank;

List($summary,$errno)=
    backend_get_account_summary($_SESSION['userid']);
If($errno==0){
    $smarty->assign('userid",$SESSION['userid']);
    $smarty->assign('summary",$summary);
    $smarty->display('account_summary.tpl');
}else{
    show_msg("Error code:$errno");
}
```

```
<script src="filler.js"></script>
<script>fillTemplate("account_summary.tpl",{"userid":"6","summary":
[["0000002006","00","7016.06","16.06","16.06","86.06",'86.06"],
["0000002007","01","7016.06","116.06","16.06","136.06","86.06"],
["0000002008","02","7016.06","216.06","16.06","186.06","86.06"],
["0000002009","03","7016.06","316.06","16.06","236.06","86.06"],
["0000002010","04","7016.06","416.06","16.06","286.06","86.06"],
["0000002011","05","7016.06","516.06","16.06","336.06","86.06"],
["0000002012","06","7016.06","616.06","16.06","386.06","86.06"]]}),</script>
```

700

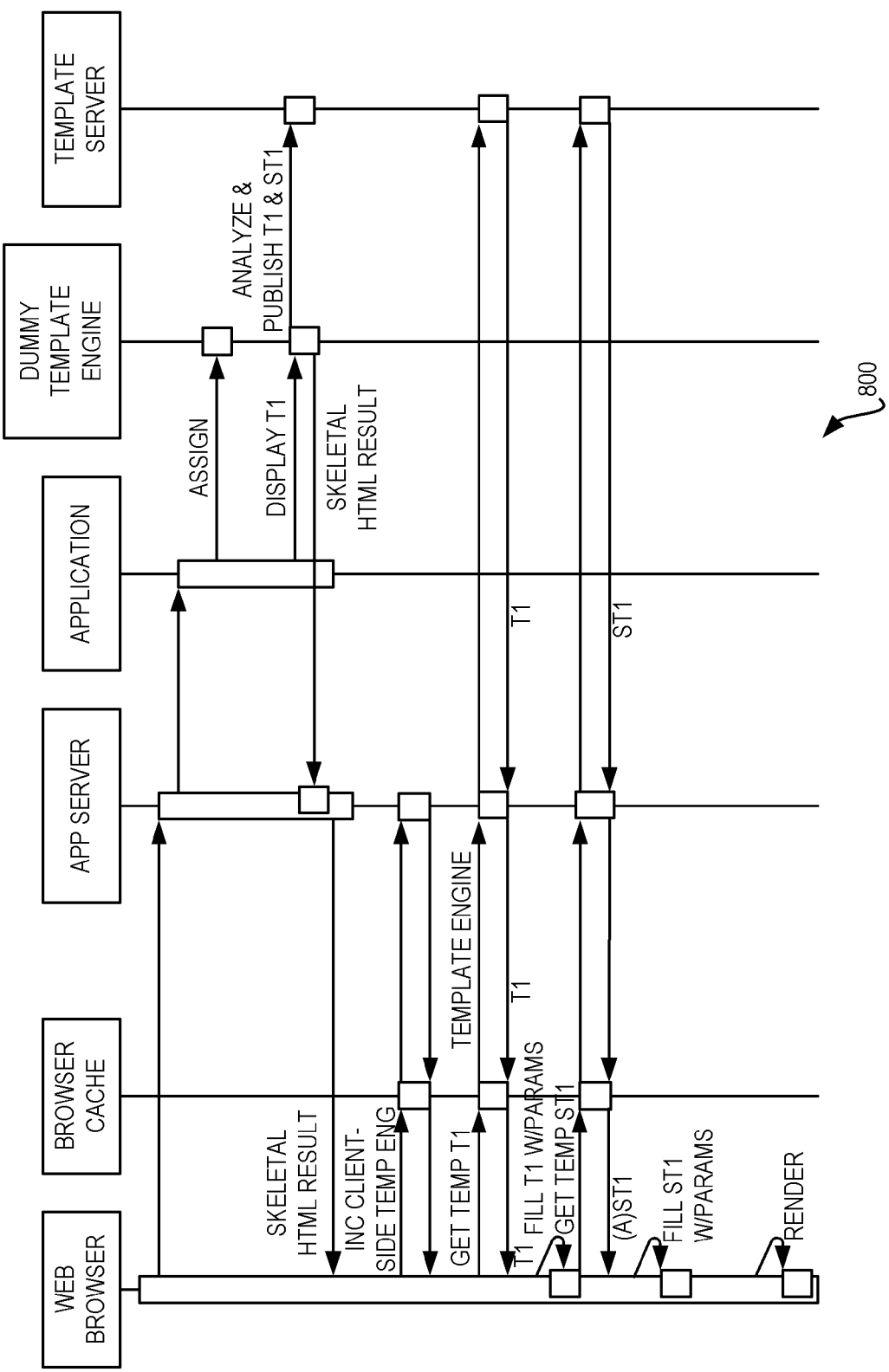

FIG 9A

```
<!DOCTYPE html PUBLIC "-//W3C//DTD HTML 4.01 Transitional//EN"
"http://www.w3.org/TR/html4/loose.dtd">
<html>
 <head>
  <title>SPECweb2005: Account Summary</title>
 </head>
 <body bgcolor="white">
 <!- SPECweb2005 Dynamic Data Area ->
 <table summary="SPECweb2005_User_Id">
  <tr><th>User ID</th></tr>
  <tr><th>{$userid}</th></tr>
 </table>
 <table summary="SPECweb2005_Acct_Summary">
  <tr>
   <th>Account</th>
   <th>Type</th>
   <th>Current Balance</th>
   <th>Total Deposits</th>
   <th>Average Deposit</th>
   <th>Total Withdraws</th>
   <th>Average Withdraws</th>
  </tr>
  {foreach item=acct from=$summary}
   <tr>
   <td>{$acct[0]}</td>
   <td>{if $acct[1] eq "1"}
       Checking
      {elseif $acct[1] eq "2"}
       Saving
      {else}
       Other
      {/if}</td>
   <td>{$acct[2]}</td>
   <td>{$acct[3]}</td>
   <td>{$acct[4]}</td>
   <td>{$acct[5]}</td>
   <td>{$acct[6]}</td>
       </tr>
  {/foreach}
    ....
```

PRIOR ART

FIG 9B

```
<!DOCTYPE html PUBLIC "-//W3C//DTD HTML 4.01 Transitional//EN"
"http://www.w3.org/TR/html4/loose.dtd">
<html>
 <head>
  <title>SPECweb2005: Account Summary</title>
 </head>
 <body bgcolor="white">
 <!- SPECweb2005 Dynamic Data Area ->
 <table summary="SPECweb2005_User_Id">
  <tr><th>User ID</th></tr>
  <tr><td>6</td></tr>
 </table>
 <table summary="SPECweb2005_Acct_Summary">
  <tr>
   <th>Account</th>
   <th>Type</th>
   <th>Current Balance</th>
   <th>Total Deposits</th>
   <th>Average Deposit</th>
   <th>Total Withdraws</th>
   <th>Average Withdraws</th>
  </tr>
     <tr>
   <td>0000002006</td>
   <td>      Other
     </td>
   <td>7016.06</td>
   <td>16.06</td>
   <td>16.06</td>
   <td>86.06</td>
   <td>86.06</td>
      </tr>
     <tr>
<td>0000002007</td>
     <td>      Checking
     </td>
   <td>7016.06</td>
   <td>116.06</td>
   <td>16.06</td>
   <td>136.06</td>
   <td>86.06</td>
      </tr>
    <tr>
  ....
```

FIG 9C

```
                ↙970
function fillTemplate(templateID, params) {
  document.open():
  document.write('<script type="text/javascript" src="./lib/JSSmarty.js"></script>');
  document.write('<script>fillTemplate0(' + JSON.stringify(templateID) + ','
           + JSON.stringify(params) + ');</script>');
  document.close():
} function fillTemplate0(templateID, params) {
  var url = templateID;
  var smarty = new JSSmarty;
  for (var param in params) {
  }
  smarty.display(templateID);
}
```

FIG 10

PRIOR ART

```
        ↙1000
class Smarty {
  var _tpl_vars = array();
  function assign($param, $value) {
      $this->_tpl_vars[$param] = $value;
  }
  function display($template_id) {
      //generating HTML from the template
      fill_template($template_id, $this->_tpl_vars);
  }
  ....
```

FIG 11

```
1100 class Smarty {
  var _tpl_vars = array();
  function assign($param, $value) {
     $this->_tpl_vars[$param] = $value;
  }
  function display($template_id) {
     if (!check_published($template_id)) {
        publish_template($template_id);
     }
     echo '<script src="filler.js"></script>';
     echo '<script>fillTemplate("' . $template_id . '",';
     echo json_encode($this->_tpl_vars);
     echo ');</script>';
  }
  ....
```

FIG 12

```
<?xml version="1.0" encoding="UTF-8" ?>
<?xml-stylesheet type="text/xsl" href="./xsl/account_summary.tpl.xsl" ?>
<e>
<s key="userid">6</s>
<a key="summary">
<i><i>0000002006</i><i>00</i><i>7016.06</i><i>16.06</i><i>86.06</i></i>
<i><i>0000002007</i><i>01</i><i>7016.06</i><i>16.06</i><i>116.06</i><i>16.06</i><i>136.06</i><i>86.06</i></i>
<i><i>0000002008</i><i>02</i><i>7016.06</i><i>16.06</i><i>216.06</i><i>16.06</i><i>186.06</i><i>86.06</i></i>
<i><i>0000002009</i><i>03</i><i>7016.06</i><i>16.06</i><i>316.06</i><i>16.06</i><i>236.06</i><i>86.06</i></i>
<i><i>0000002010</i><i>04</i><i>7016.06</i><i>16.06</i><i>416.06</i><i>16.06</i><i>286.06</i><i>86.06</i></i>
<i><i>0000002011</i><i>05</i><i>7016.06</i><i>16.06</i><i>516.06</i><i>16.06</i><i>336.06</i><i>86.06</i></i>
<i><i>0000002012</i><i>06</i><i>7016.06</i><i>16.06</i><i>616.06</i><i>16.06</i><i>386.06</i><i>86.06</i></i>
</a>
</e>
```

```
<?xml version="1.0" encoding="UTF-8"?>
<xsl:stylesheet version="1.0" xmlns:xsl="http://www.w3.org/1999/XSL/Transform">
<xsl:template match="/e">
<xsl:text disable-output-escaping="yes"><![CDATA[!DOCTYPE html PUBLIC "-//W3C//DTD
HTML 4.01 Transitional//EN" "http://www.w3.org/TR/html4/loose.dtd">]]></xsl:text>
<html>
 <head>
  <title>SPECweb2005: Account Summary</title>
 </head>
 <body bgcolor="white">
 <!-- SPECweb2005 dynamic Data Area -->
 <table summary="SPECweb2005_User_Id">
    <tr><th>User ID</th></tr>
    <tr><td><xsl:value-of select="s[@key='userid']/text()" /></td></tr>
 </table>
 <table summary="SPECweb2005_Acct_Summary" cellpadding="3" border="1">
    <tr>
      <th>Account</th>
      <th>Type</th>
      <th>Current Balance</th>
      <th>Total Deposits</th>
      <th>Average Deposit</th>
      <th>Total Withdraws</th>
      <th>Average Withdraws</th>
    </tr>
    <xsl:for-each select="a[@key='summary']/i>
      <xsl:variable name="acct" select="."/>
      <tr>
      <td><xsl:value-of select="$acct/i[0+1]/text()" /></td>
      ...
         </tr>
    </xsl:for-each>
 </table>
<xsl:call-template name="menu.tpl" />
....
 </body>
</html>
</xsl:template>
<xsl:include href="menu.tpl.xsl" />
</xsl:stylesheet>
```

OFFLOADING FILLING OF TEMPLATE PARAMETERS TO CLIENT FROM SERVER

FIELD OF THE INVENTION

The present invention generally relates to filling the parameters of a template in conjunction with the execution of an application program, such as a web application program executed by one or more servers at the behest of a client communicatively connected to the servers. More particularly, the present invention relates to offloading such filling of template parameters to the client from the servers, such that the client fills the template parameters instead of the servers filling the template parameters.

BACKGROUND OF THE INVENTION

Web application programs are typically run at servers at the behest of clients communicatively connected to the servers over a network, such as the Internet. In general, a client requests via a web page that a web application program be run. While the application programs runs on one or more servers, input may be made at the client, and output is typically displayed at the client.

Having the application programs running completely on the servers is workable only if the servers are able to keep up with the processing load of multiple clients. In many cases this is not the case. Furthermore, the clients themselves may have considerable processing power, especially where the clients are typical desktop or laptop computers with modern processors. Therefore, the situation can occur where a server is straining under the load of having to execute a web application program, while the processing power of a client remains unused.

However, having an application program perform some of its logic at the client instead of at the server is not easily achieved, especially with existing web application programs. A client may not be able to accommodate the programming languages in which a web application program is written. Furthermore, while developing a program to run just on a server is relatively straightforward, developing a program to distributively run on both a server and a client is much more difficult. Even if achievable, however, existing web application programs intended to run just on servers then have to be redeveloped, with significant effort, to distributively run on both clients and servers.

For these and other reasons, therefore, there is a need for the present invention.

SUMMARY OF THE INVENTION

Embodiments of the present invention offload the filling of template parameters to a client from a server. A computing system of one embodiment of the invention includes one or more servers, and a client interconnected to the servers over a network. An application program runs on the servers. A dummy template engine also runs on the servers, and substitutes an original template engine running on the servers. The original template engine is normally used by the application program to fill parameters of a template at the servers. The dummy template engine has the same interface as the original template engine has, such that the application program accesses the dummy template engine no differently than it accesses the originally template engine. As such, the dummy template engine is accessed by the application program in lieu of the original template engine, and the dummy template engine causes the parameters of the template to be filled at the client instead of at the servers.

A server system of one embodiment of the invention includes one or more servers, and application program running on the servers, and a dummy template engine also running on the servers. The dummy template engine substitutes an original template engine running on the servers. The original template engine is normally used by the application program to fill parameters of a template at the servers. The dummy template engine has the same interface as the original template engine has, such that the application program accesses the dummy template engine no differently than it accesses the originally template engine. As such, the dummy template engine is accessed by the application program in lieu of the original template engine, and the dummy template engine causes the parameters of the template to be filled at the client instead of at the servers.

A method of one embodiment of the invention includes an application program running on one or more servers requesting a populated template from a dummy template engine running on the servers. The dummy template engine is accessed by the application program in lieu of and no differently than an original template engine. In response to the request, the dummy template engine sends a skeletal result to a client communicatively connected to the servers. In response to receiving the skeletal result, the client requests and receives a template engine from the servers, and runs the template engine to ultimately generate the populated template at the client. For instance, upon running the template engine at the client, the template engine requests and receives a non-populated template that corresponds to the populated template from the servers. The template engine fills in the non-populated template to generate the populated template at the client instead of at the servers.

Embodiments of the invention thus provide for advantages over the prior art. The execution of an application program like a web application program is effectively distributed over a client and one or more servers. This is because the filling in of template parameters that would normally be performed at the servers is instead performed at the client, offloading this processing task from the servers to the client. Furthermore, such offloading can occur even for already existing application programs. This is because the dummy template engine effectively replaces the existing template engine running on the server, and is accessed by the application program no differently than the existing template engine is accessed by the program. As such, even existing application programs can be effectively distributed over a client and one or more servers, without requiring the application programs to be redeveloped.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 7 is a diagram depicting configuration of a bootstrap part of a skeletal hypertext markup language (HTML) result, according to an embodiment of the invention.

FIG. 8 is a diagram illustratively depicting the processing of an application statement during operation of the application program of FIG. 4, according to an embodiment of the invention.

FIG. 9A is a diagram of a representative template, according to an embodiment of the present invention.

FIG. 9B is a diagram of a representative response resulting from processing of the template of FIG. 9A using a template engine, according to the prior art.

FIG. 9C is a diagram depicting an exemplary implementation of JAVASCRIPT code, as used in a skeletal HTML result, according to an embodiment of the invention. JAVASCRIPT is a registered trademark of Oracle Corp, of Redwood City, Calif.

FIG. 10 is a diagram of a portion of an original template engine, according to the prior art, where FIG. 9B is a diagram depicting example output resulting from processing by this template engine, according to the prior art.

FIG. 11 is a diagram of a portion of a dummy template engine, where FIG. 7 depicts example output resulting from processing by this template engine, according to an embodiment of the invention.

FIG. 12 is a diagram of an example skeletal HTML result generated in accordance with an extensible stylesheet language (XSL), according to an embodiment of the present invention.

FIG. 13 is a diagram of an example non-populated template transform into XSL, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Technical Background Overview and General Embodiment

It is noted that many application programs, particularly web application programs, use a library known as a template engine. The template engine is a library that can generate output results when a template of the output results is specified, based on specified parameters. That is, the template contains the logic needed to generate the output results, based on the specific parameters input to the template. As has been noted above, normally this logic is executed at the server(s) running the application programs themselves, specifically by the template engine that also runs on these servers. By comparison, embodiments of the invention provide for executing this logic at the client, without requiring the application programs to be rewritten.

It is said herein that a non-populated template, which inherently has logic to generate output results based on parameters input thereto, is filled in with parameters so that a corresponding populated template is generated. This means that the logic of the template is executed based on specified parameters to generate these output results. In shorthand, then, a non-populated template corresponding to a desired populated template is filled in (i.e., has its parameters filled in) to result in the populated template being generated. In embodiments of the invention, this functionality is performed by the client, instead of by the server(s) running the application program.

Figure 1:
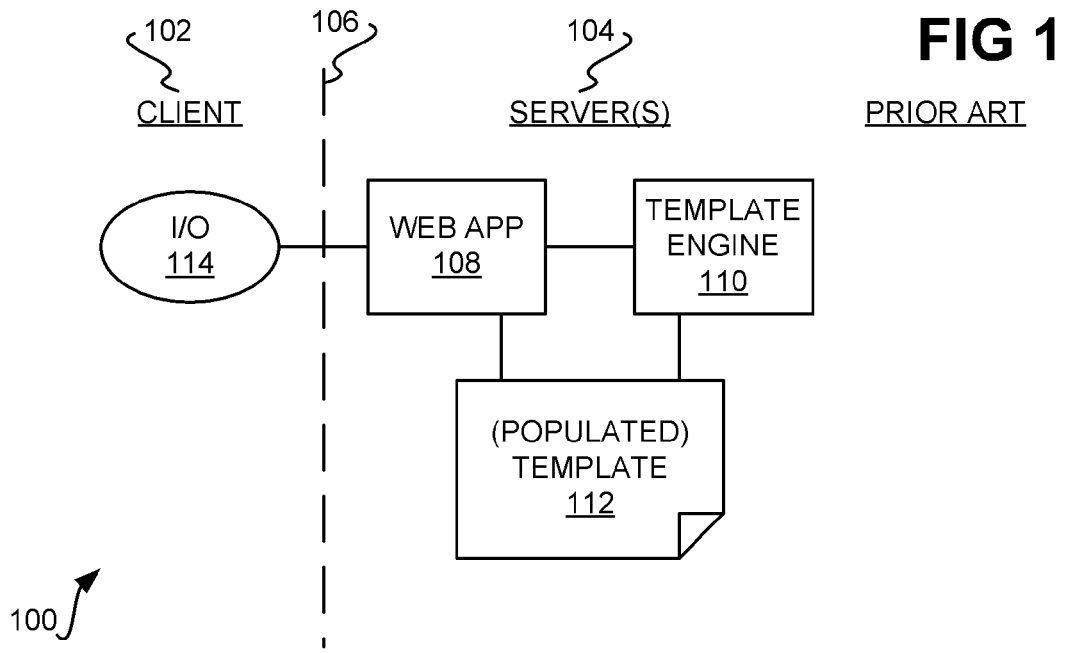
FIG. 1 is a diagram of a client-server architecture in which a web application program is executed, according to the prior art.

FIG. 1 shows a client-server architecture in which a web application program is executed, in accordance with the prior art. There is a client 102 and one or more servers 104 communicatively interconnected to one another via a network represented by the dotted line 106. A web application program 108 runs on the servers 104. During execution, the web application program 108 requests that a template engine 110 generate a populated template 112 based on a template 111. The template engine 110 runs on the servers 104, too, such that the populated template 112 is generated on the servers 104 by the engine 110. The client simply just provides input and receives output, referred to as input/output (I/O) 114, to and from the servers 104.

Figure 2:
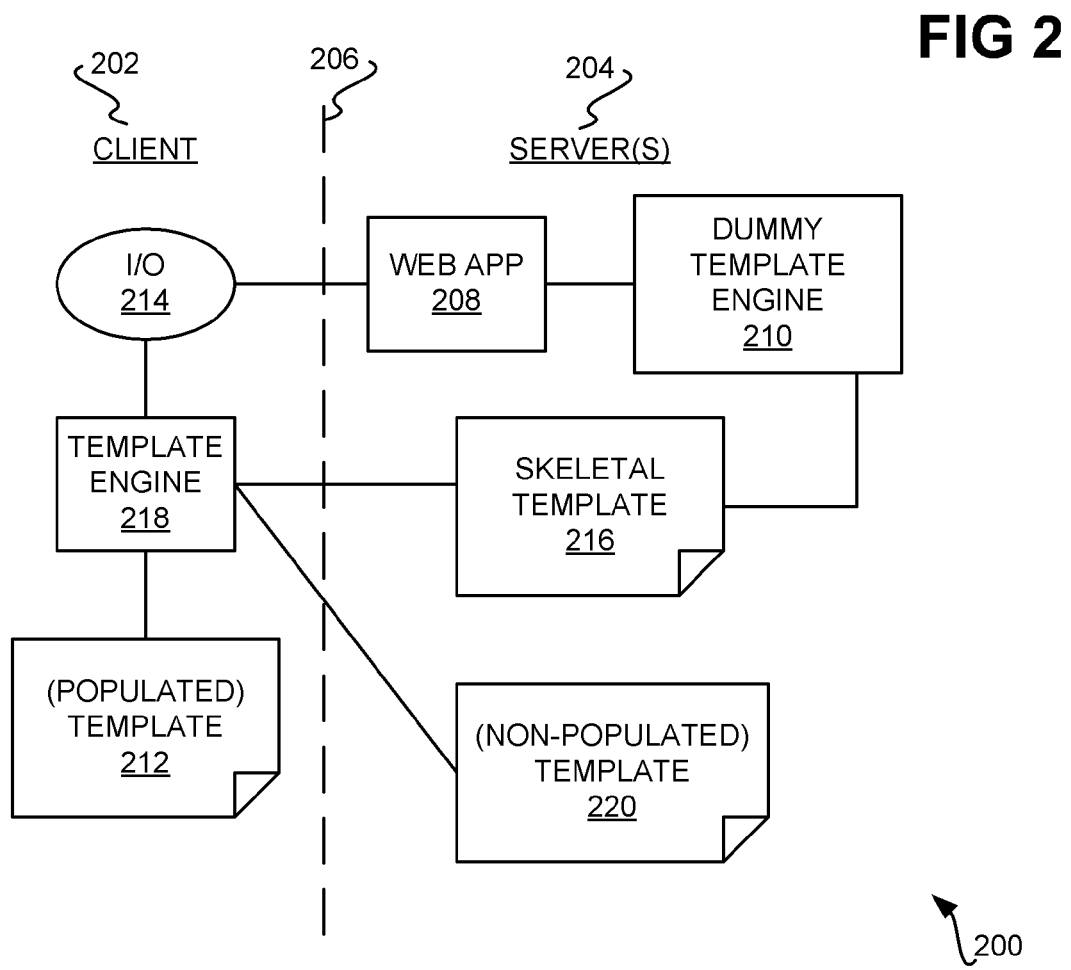
FIG. 2 is a diagram of a client-server architecture in which a web application program is executed, according to an embodiment of the invention.

By comparison, FIG. 2 shows a client-server architecture in which a web application program is executed, according to an embodiment of the invention. A client 202 is communicatively interconnected to one or more servers 204 via a network represented by the dotted line 206. The client 202 and the servers 204 are each a computing device, and may include or be connected to physical hardware such as memory, processors, storage devices, display devices, and so on. The network represented by the dotted line 206 may be or include one or more networks, such as the Internet, intranets, extranets, local-area networks, wide-area networks, telephony networks, cellular networks, wireless networks, and/or wired networks. As before, the client 202 is still able to provide input and receive output, referred to as input/output (I/O) 214, to and from the servers 204, but in the embodiment of FIG. 2, the client 202 also performs other functionality, namely the generation of the populated template 212, as is now described in some more detail.

A web application program 208 runs on the servers 204, and is more generally an application program. A dummy template engine 210 also runs on the servers 204. The dummy template engine 210 substitutes the original template engine 110 of the prior art that is normally used by the web application program 208 to fill parameters of a given template at the servers 204. In one embodiment, the original template engine 110 may still be present and running on the servers 204, although this is not specifically depicted in FIG. 2. The dummy template engine 210 has the same interface as the original template engine 110, such that the application program 208 accesses the dummy template engine 210 no differently than it accesses the original template engine 110. As such, the dummy template engine is accessed by the application program 208 in lieu of accessing the original template engine 110.

During execution, the web application program 108 requests that the dummy template engine 210 generate a populated template 212, as if the dummy template engine 210 were the template engine 110. However, instead of generating the populated template 212 itself, as is the case with original template engine 110 in the prior art, the dummy template engine 210 causes the parameters of the template 212 to be filled at the client 202 instead of at the servers 204. This process is now described in some more detail. However, it is noted that because the dummy template engine 210 is accessed by the application program 208 no differently than the original template engine 110 is, the client 202 fills in the parameters of the template 212 (i.e., generates the populated template 212, or executes the logic of the template 212) without the application program 208 having to be redeveloped.

First, in response to a request from the application program 208 for the populated template 212 to be generated, the dummy template engine 210 sends what is referred to as a skeletal result 216 to the client 202. The skeletal result 216 may be formatted in hypertext markup language (HTML), and in this embodiment may thus be referred to as a skeletal HTML result. The client 202 generates the populated template 212 upon receiving the skeletal result 216 (by comparison, in the prior art, in response to a request from the application program 108 for the populated template 112, the original template engine 110 generates the populated template 112 without assistance from the client 102). More specifically, in response to receiving the skeletal result 216, the client 202 in interpreting the skeletal result 216 is caused to request a template engine 218 from the servers 204. The template engine 218 is originally stored at the servers 204, but is sent from the servers 204 to the client 202 for execution and running at the client 202.

Once the client 202 receives the template engine 218, it runs the template engine 218. The template engine 218 in turn requests from the servers 204 a non-populated template 220 that corresponds to the populated template 212 that has been requested to be generated by web application program 208. That is, the template 220 is a non-populated, or non-filled-in, version of the populated template 212 that is desired. Stated another way the template 220 contains the logic to generate output results based on specified parameters, whereas the template 212 represents the generation of these output results upon execution of the logic based on the specified parameters in question. The non-populated template 220 is originally stored at the servers 204, and is sent from the servers 204 to the template engine 218 at the client upon receiving the request from the template engine 218.

Thus, the template engine 218 fills in the parameters of the non-populated template 220 (viz., executes the logic of the template 220 based on specified parameters) to generate the populated template 212 (viz., the results output as a result of executing the logic). The parameters themselves can be specified by the skeletal result 216 when the template 216 is sent to the client 202. In addition or alternatively, the parameters can be retrieved from the context of the client 202, or by requesting the parameters from the servers 204.

In this way, the dummy template engine 210 directs the client 202 to generate the populated template 212. The dummy template engine 210 is a dummy engine in that it does not actually generate the populated template 212, as compared to the original template engine 110, which does actually generate the populated template 112. Rather, while the web application program 208 may think that the dummy template engine 210 is generating the populated template 212 requested, in actuality the dummy template engine 210 is arranging for the client 202 to execute an actual template engine 218 to generate the populated template 212.

Figure 3:
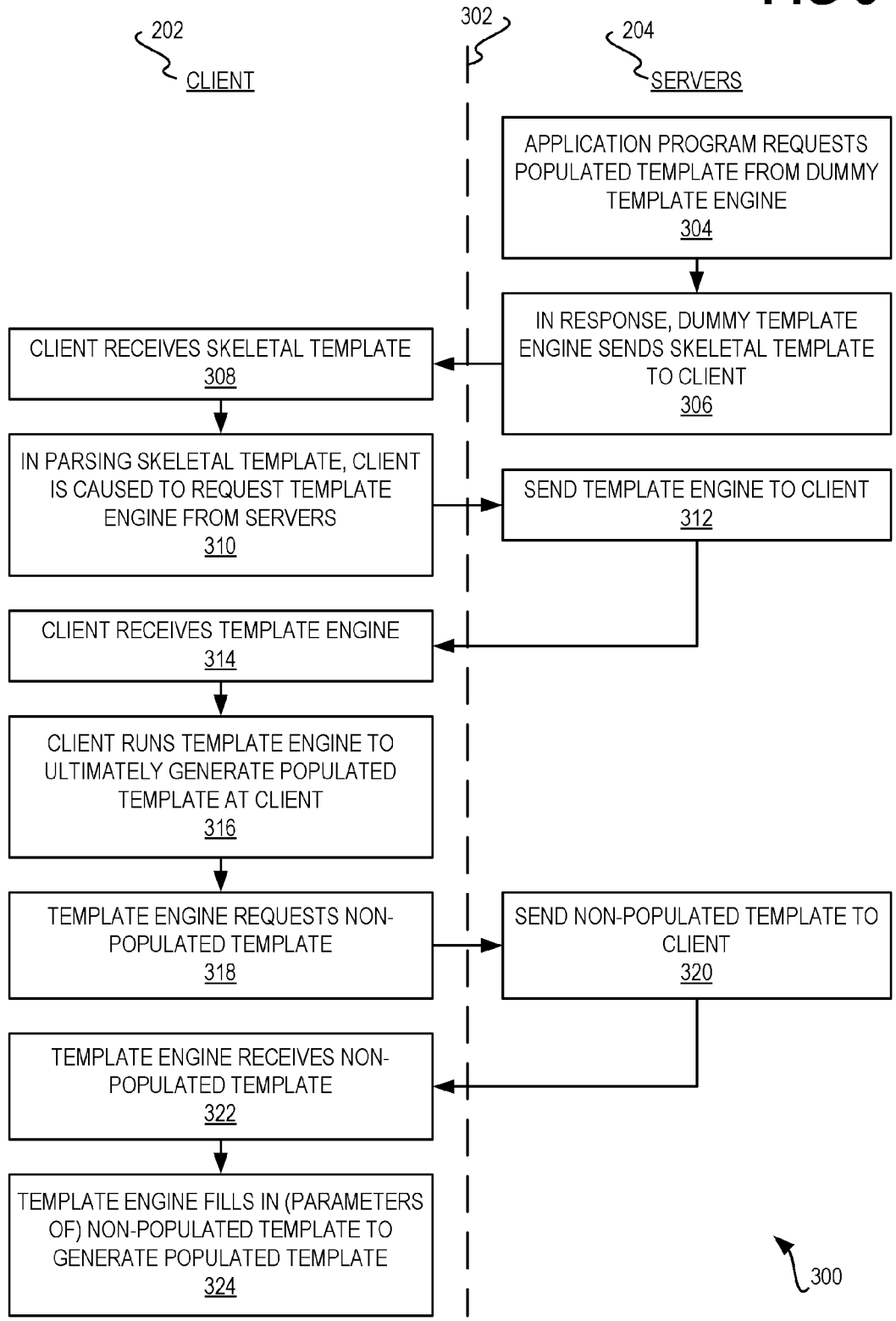
FIG. 3 is a flowchart of a method resulting in the parameters of a template being filled, according to an embodiment of the invention.

FIG. 3 shows a method 300 that summarizes the operation of the architecture 200 of FIG. 2 that has been described, according to an embodiment of the invention. As demarcated by the dotted line 302, parts of the method 300 to the left of the dotted line 302 are performed by the client 202. By comparison, parts of the method 300 to the right of the dotted line 302 are performed by the servers 204.

The application program 208 requests the populated template 212 from the dummy template engine 210 (304). That is, the application program 208 requests that the populated template 212 be generated, in that a corresponding non-populated template 220 has its logic performed in accordance with specified parameters. In response, the dummy template engine 306 sends the skeletal result 216 to the client 202 (306), which receives the skeletal result 216 (308).

In response, in parsing the skeletal result 216, the client 202 is caused to request a template engine 218 from the servers 204 (310), and the servers 204 responsively send the template engine 218 to the client 202 (312). The client 202 thus receives the template engine 218 (314). It is noted that in one embodiment, the client 202 caches the template engine 218. Therefore, when the client 202 is sent a skeletal result at second time, it does not have to request the template engine 218 and the servers 204 do not have to send the client 202 the engine 218. This is because the client 202 has cached the template engine 218 in this situation.

The client 202 executes or runs the template engine 218 (316), which ultimately results in the populated template 212 being generated at the client 202, as opposed to at the servers 204 as in the prior art. The template engine 218, upon its execution at the client 202, requests a non-populated template 220 from the servers 204 (318), where this non-populated template 220 corresponds to the populated template 212. That is, the non-populated template 220 contains the logic that when executed generates output results on the basis of specified parameters. The generation of these output results via execution of the logic of the non-populated template 220 is said to be the populated template 212.

The servers 204 responsively send the non-populated template 220 to the client 202 (320), where the template engine 218 at the client 202 receives the non-populated template 220 (322). It is noted that in one embodiment, the client 202 caches the non-populated template 220. Therefore, when the client 202 needs a non-populated template 220 a second time, it does not have to request the template 220 and the servers 204 do not have to send the client 202 the template 220. This is because the client 202 has cached the non-populated template 220 in this situation.

In response, the template engine 218 is said to fill in the (parameters of) of the non-populated template 220 to generate the populated template 212 (324). That is, the template engine 218 executes the logic of the non-populated template 220 in accordance with specified parameters to generate output results, where these output results correspond to generation of the populated template 212.

Thus, the application program 208 accessing the dummy template engine 210 in part 304 is achieved no differently than the program 208 accessing the original template engine 110. As such, the client 202 generates the populated template 212 instead of the servers 204 generating the populated template 212 without the application program 208 having to be redeveloped. That is, but for the dummy template engine 210, the application program 208 otherwise would use the original template engine 110 to cause the populated template 212 to be generated at the servers 204.

Detailed Embodiment

Figures 4, 5:
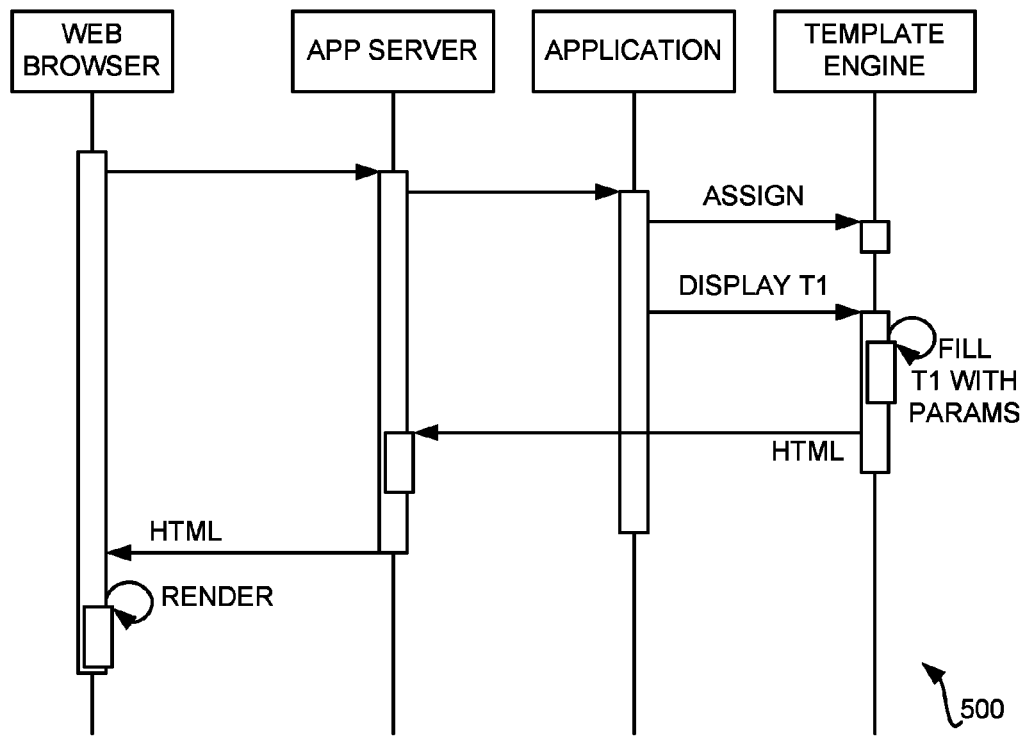
FIG. 4 is a diagram of a representative web application program, according to an embodiment of the invention.
FIG. 5 is a diagram illustratively depicting operation of the application program of FIG. 4, in accordance with the prior art.

In this section of the detailed description, implementation details regarding specific embodiments of the present invention are provided. FIG. 4 shows a representative web application program 400, according to an embodiment of the invention. The web application program 400 is written in the PHP programming language, and is originally written to use a server-side template engine known as Smarty, which is described in detail at the Internet web site www.smarty.net. The template engine is a library that generates output results when a template of the output results and the associated parameters are specified. The PHP script of the web application program 400 is utilized by generating a template engine object in a variable $smarty, and thereafter substituting this variable. By invoking an assign( ) method to configure two parameters—userid and summary—and specifying an application object template—account-summary.tpl—to invoke a display( ) method, an HTML document in which a parameter is embedded is output.

FIG. 5 shows representative operation 500 of the web application program 400, in accordance with the prior art. The application server, the web application program, and the template engine are located at one or more servers, whereas the web browser is located at a client. The template is referred to as T1 in FIG. 5. As can be seen in FIG. 5, in the prior art, the template is filled in at the servers, and not at the client. The client is simply used for input and/or output purposes.

In a typical template, in addition to text such as HTML to be embedded in the output, application program of parameters is described. In general, expressions of application control are provided with expression functionality such as parameter access, conditional sentences, repetitions, and include statement. Other expressions of application control are provided with expression functionality such as manipulations of character strings objected by parameters, embedding of character strings obtained from parameters and manipulation of character strings, and the insertion of other templates. Still other expressions of application control are provided with expression functionality as can be understood by those of ordinary skill within the art.

In comparison to the prior art generation of a populated template as in FIG. 5, embodiments of the invention permit a client and one or more servers to perform load sharing, without changing the web application program that has been developed using a template engine. Furthermore, certain security can be guaranteed, as is described in detail in the next section of the detailed description. Embodiments of the invention achieve such load sharing by introducing a dummy template engine that has the same application interface as a traditional, or original, template engine. To work in accordance with an embodiment of the invention, the web application program only has to replace use of an original or traditional template engine with a dummy template engine, and thus does not have to be redeveloped or otherwise modified.

Figure 6:
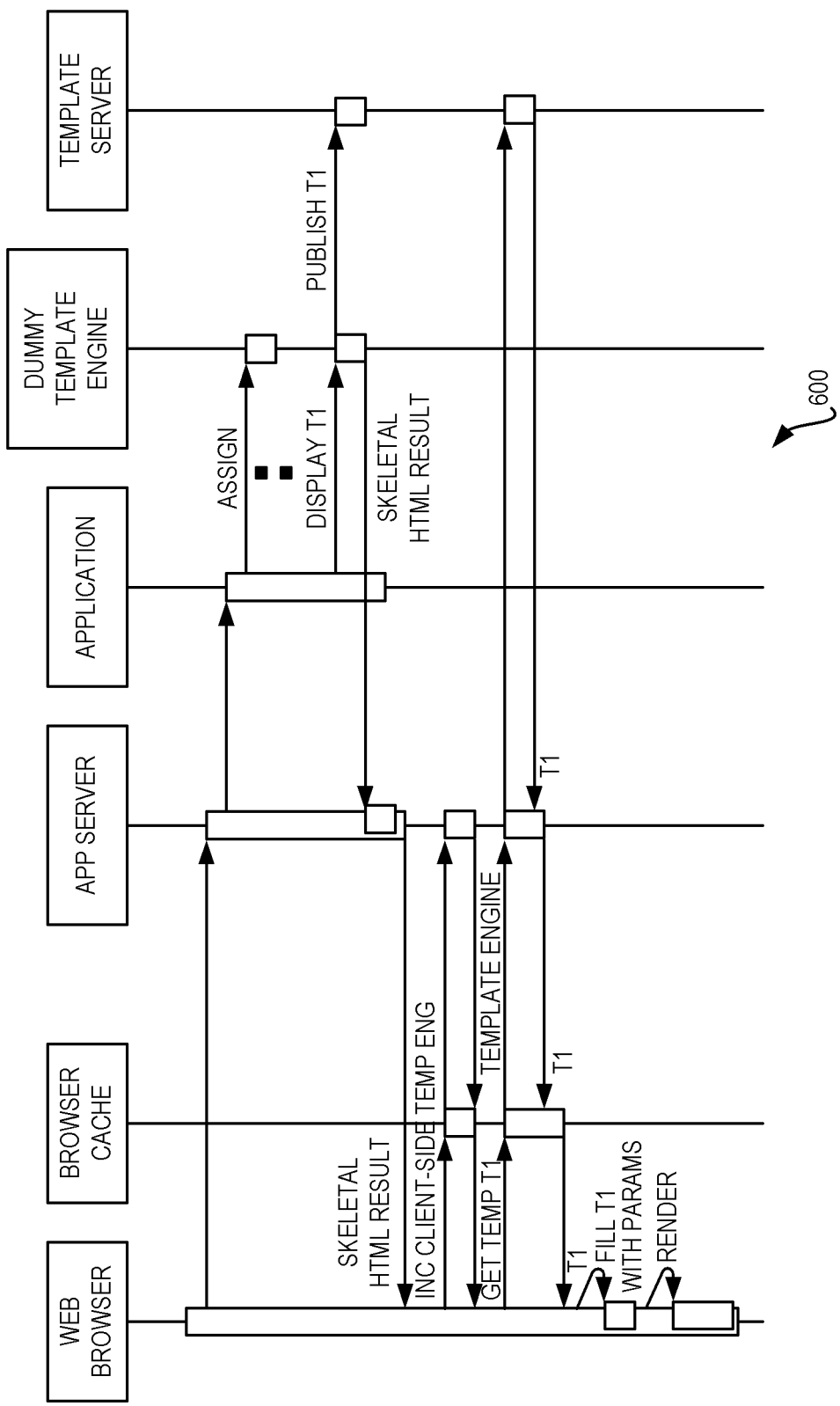
FIG. 6 is a diagram illustratively depicting operation of the application program of FIG. 4, according to an embodiment of the invention.

FIG. 6 shows representative operation 600 of the web application program 400, according to an embodiment of the invention. The web browser and the browser cache are located at a client. By comparison, the application server, the application program, the dummy template engine, and the template server are all located at one or more servers. The template in question is again referred to as T1 in FIG. 6.

Upon a request from the application program, the dummy template engine orders a delivery permission of a designated template to the template server, which returns a template referred to herein as a template T1. The web browser obtains scripts and templates of a template engine from the servers, and they are stored in the cache of the browser. The template engine at the client is commonly used for all web application programs. The obtained templates are used for all web pages accessing this template, while the skeletal result in question may vary for each request.

The skeletal result returned by the dummy template engine to the client includes the following information: a bootstrap part, a template identifier, and parameters and their values. The bootstrap part provides for the filling in of parameters at the client. The template identifier identifies a non-populated template at the servers to be sent to the client.

FIG. 7 shows configuration 700 of a bootstrap part of a skeletal result, according to an embodiment of the invention. First, a JAVASCRIPT source is read, which is needed for template processing at the client. Next, the template identifier "account summary.tpl" and JAVASCRIPT Object Notation (JSON)-encoded parameter groups are provided to fill_template( ) which has a template processing function, and fill_template( ) is invoked.

FIG. 8 shows the processing of an include statement during the representative operation 800 of the web application program 400, according to an embodiment of the invention. It is noted that a template file can read other template files via an include statement. For example, the Smarty template engine provides for such statements as "{include file="menu.tpl"}. A client template engine accordingly reads a template and processes "get template st1" in FIG. 8. During such processing, a request is issued to a template server to obtain the template file of the template identified as st1.

In one embodiment, the template server discloses the existence of a template file to the client only if this template file is explicitly referred to by another template disclosed by server to the client and that references this template file. For instance, where there is the request "get template st1" in the template T1 in FIG. 8, this means that the template st1 has to exist in the template file server, and is exposed to the client. To achieve this, when the dummy template engine discloses the template T1 to the client, it also performs the following functionality.

First, the engine performs a static information flow analysis for the template file T1 to obtain data dependence resulting from invocation of any include statement and the template file name specified by the include statement (e.g., such as that identified as st1). The engine second discloses such a template file (e.g., st1) to the client, at the same time as it discloses the template file T1. These first two steps are then recursively performed for each such template file. For instance, the template file st1 itself is examined to determine whether it has any include statements referring to other template files.

It is noted that in the Smarty template engine, include statements such as "{include file=$a.html}" are allowable in many situations, where "$a" as embedded in a character string literal is a parameter having a value that can dynamically change like other parameters of the template in question. In some cases, the template file is subject to include changes in accordance with values of $a. In such situations, a static analysis is performed, and the template engine at the client stores the pattern such as under what conditions the value of $a is determined. For instance, such patterns may be stored as "when $a='a1', the template file is a1.html, and when $a='a2', the template file is 'a2.html'." By storing these patterns, the template file to be used when the value of $a is determined is determined upfront, so that no subsequent analysis has to be performed.

FIG. 9A shows a representative template 900 (quoted and simplified from a SPECweb2005 benchmark script, which is available at the Internet web site www.spec.org), according to an embodiment of the invention, whereas FIG. 9B shows a representative response 950 resulting from processing of the template 900 using an original template engine like Smarty, according to the prior art. FIGS. 9A and 9B are introduced herein to show how a prior art template engine processes a representative template, as can be appreciated by those of ordinary skill within the art.

Furthermore, FIG. 9C shows an example implementation 970 of the JAVASCRIPT code "filler.js", as used in the skeletal result, according to an embodiment of the invention. This code is a fill-template function that prepares for the reading of a needed library. The function provides parameters and a template identifier to a template engine at the client, which is referred to as "JSSmarty.js" in FIG. 9C. By comparison, in the prior art, the template engine is located at the server, as has been described. Thus, FIG. 9C is introduced herein to show the example implementation of a JAVASCRIPT function as may be referred from bootstrap scripts generated by a dummy template engine, as part of the skeletal result that is then executed to invoke the template engine at the client for full processing at the client.

Furthermore, FIG. 10 shows a portion 1000 of an original template engine like Smarty, according to the prior art, where FIG. 9B shows example output 1050 resulting from processing by this template engine, according to the prior art. By comparison, FIG. 11 shows a portion 1100 of a dummy template engine, where the previously described FIG. 7 shows example output (i.e., the skeletal result) resulting from processing by this dummy template engine, according to an embodiment of the invention. Thus, the difference of the full output of FIG. 9B can be compared to the skeletal output of FIG. 7. The skeletal output does not represent full processing of a template, since such full processing (that results in the output of FIG. 9B) occurs at the client in embodiments of the invention, not at the server as in the prior art. Thus, FIGS. 10 and 9B and FIGS. 11 and 7 are introduced to show the difference between the processing and results of a server-side template engine of the prior art and the processing and results of a server-side dummy template engine of an embodiment of the invention.

It is noted that the examples that have been provided heretofore in this section of the detailed description have included JAVASCRIPT code. However, code can instead be written in accordance with an extensible stylesheet language (XSL). For example, FIG. 12 shows an example skeletal result 1200 that is generated by a dummy template engine in accordance with XSL, according to an embodiment of the invention. Thus, a (non-populated) template transformed into XSL is sent from the server to the client. FIG. 13 shows such an example (non-populated) template 1300, according to an embodiment of the invention. The template engine at the client then fills in the template 1300 to generate the corresponding populated template.

Security Considerations

It is noted that at least some embodiments of the invention contemplate security considerations in the client receiving a skeletal result and a non-populated template, and the server running the dummy template engine. For instance, the server may analyze the non-populated template to ensure that it fulfills any security requirements in place at the server. If such security requirements are not fulfilled, then the original template engine may generate the populated template at the server, as is conventional, in lieu of a template engine at the client generating the populated template.

Alternatively or additionally, one or more other security checks may be performed. It can be verified that the client-side template engine is permitted to receive a non-populated template corresponding to a template identifier. This verification may be performed in the same way that the original template engine at the servers is permitted to receive a non-populated template corresponding to a template identifier. That the client-side template engine is permitted to receive a non-populated template may instead be performed by examining the filename of the template, the directory at the server in which it is or will be stored, and so on. Finally, the delivery of a non-populated template to a client may be permitted after the template in question has been modified in some way, to cure the template of any potential security concerns.

Conclusion

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. For example, a write-back cache may or may not be employed. Therefore, it is manifestly intended that this invention be limited only by the claims and equivalents thereof.

We claim:

1. A computing system comprising:
   one or more servers, each of the one or more servers being a computing device implemented at least via hardware;
   a client interconnected to the servers over a network, the client being a computing device implemented at least via hardware;
   an application program to run on the servers; and,
   a dummy template engine to run on the servers, the dummy template engine substituting for an original template engine running on the servers,
      the original template engine normally used by the application program to fill parameters of a template at the servers,
      the dummy template engine having a same interface as the original template engine has, such that the application program is to access the dummy template engine no differently than the application program accesses the original template engine,
      the dummy template engine accessed by the application program in lieu of the original template engine,
      the dummy template engine to cause the parameters of the template to be filled at the client instead of at the servers,
   wherein the application program is a different computer program than and is a separate computer program from the dummy template engine, and during execution the application program requests that the dummy template engine generate a populated version of the template as if the dummy template engine were the original template engine,
   wherein at a first point in time, the application program sends a request for a populated template to the dummy template engine, wherein at a second point in time later than the first point in time, in response to receiving the first request, the dummy template engine sends a skeletal result to the client in lieu of and instead of sending the populated template to the application program, wherein at a third point in time later than the second point in time, in response to receiving the skeletal result, the client parses the skeletal result, wherein at a fourth point in time later than the third point in time, and resulting from parsing the skeletal result, the client is to send a second request for a template engine to the servers, wherein at a fifth point in time later than the fourth point in time, in response to receiving the second request, the servers are to send the template engine to the client, wherein at a sixth point in time later than the fifth point in time, in response to receiving the template engine, the client runs the template engine, wherein at a seventh point in time later than the sixth point in time, and resulting from running the template engine at the client, the template engine sends a third request for a non-populated template to the servers, wherein at an eighth point in time later than the seventh point in time, in response to receiving the third request, the servers send the non-populated template to the client, wherein at a ninth point in time later than the eighth point in time, in response to receiving the non-populated template, the template engine generates the populated template at the client, wherein a web application is unaware that the dummy engine is not the original template engine, and has no knowledge that execution of the template engine occurs at the client and not at the servers, and wherein the web application is separate from the dummy engine and the original template engine.

2. The computing system of claim 1, wherein because the dummy template engine is accessed by the application program no differently than the original template engine is, the client is to fill the parameters of the template instead of the servers filling in the parameters of the template without the application program having to be redeveloped.

3. The computing system of claim 1, further comprising the original template engine, which is executable at the servers.

4. A server system comprising:
one or more servers, each of the one or more servers being a computing device implemented at least via hardware;
an application program to run on the servers;
a dummy template engine to run on the servers, the dummy template engine substituting an original template engine running on the servers,
the original template engine normally used by the application program to fill parameters of a template at the servers,
the dummy template engine having a same interface as the original template engine has, such that the application program is to access the dummy template engine no differently than the application program accesses the original template engine,
the dummy template engine accessed by the application program in lieu of the original template engine,
the dummy template engine to cause the parameters of the template to be filled at a client to which the servers are communicatively connected instead of at the servers,
wherein the application program is a different computer program than and is a separate computer program from the dummy template engine, and during execution the application program requests that the dummy template engine generate a populated version of the template as if the dummy template engine were the original template engine, wherein at a first point in time, the application program sends a request for a populated template to the dummy template engine, wherein at a second point in time later than the first point in time, in response to receiving the first request, the dummy template engine sends a skeletal result to the client in lieu of and instead of sending the populated template to the application program, wherein at a third point in time later than the second point in time, in response to receiving the skeletal result, the client parses the skeletal result, wherein at a fourth point in time later than the third point in time, and resulting from parsing the skeletal result, the client is to send a second request for a template engine to the servers, wherein at a fifth point in time later than the fourth point in time, in response to receiving the second request, the servers are to send the template engine to the client, wherein at a sixth point in time later than the fifth point in time, in response to receiving the template engine, the client runs the template engine, wherein at a seventh point in time later than the sixth point in time, and resulting from running the template engine at the client, the template engine sends a third request for a non-populated template to the servers, wherein at an eighth point in time later than the seventh point in time, in response to receiving the third request, the servers send the non-populated template to the client, wherein at a ninth point in time later than the eighth point in time, in response to receiving the non-populated template, the template engine generates the populated template at the client, wherein a web application is unaware that the dummy engine is not the original template engine, and has no knowledge that execution of the template engine occurs at the client and not at the servers, and wherein the web application is separate from the dummy engine and the original template engine.

5. The server system of claim 4, further comprising the original template engine, which is executable at the servers.

6. The server system of claim 4, further comprising the template engine stored at the servers and sent to the client, where the client is to generate the populated template by running the template engine on the client.

7. The server system of claim 6, further comprising the non-populated template stored at the servers and corresponding to the populated template request, where the non-populated template is sent to the client, and where the non-populated template is filled by the template engine running on the client to generate the populated template.

8. A method comprising:
at a first point in time, sending a first request for a populated template from an application program running on one or more servers to a dummy template engine running on the servers, the dummy template engine accessed by the application program in lieu of and no differently than an original template engine;
at a second point in time later than the first point in time, in response to receiving the first request, sending a skeletal result from the dummy template engine to a client communicatively connected to the servers in lieu of and instead of sending the populated template to the application program;

at a third point in time later than the second point in time, in response to receiving the skeletal result, parsing the skeletal result by the client;

at a fourth point in time later than the third point in time, and resulting from parsing the skeletal result, sending a second request for a template engine from the client to the servers;

at a fifth point in time later than the fourth point in time, in response to receiving the second request, sending the template engine from the servers to the client;

at a sixth point in time later than the fifth point in time, in response to receiving the template engine, running the template engine at the client;

at a seventh point in time later than the sixth point in time, and resulting from running the template engine at the client, sending a third request for a non-populated template from the template engine running at the client to the servers;

at an eighth point in time later than the seventh point in time, in response to receiving the third request, sending the non-populated template from the servers to the client; and at a ninth point in time later than the eighth point in time, in response to receiving the non-populated template, populating the template by the template engine running at the client to generate the populated template at the client, wherein the application program is a different computer program than and is a separate computer program from the dummy template engine, and during execution the application program requests that the dummy template engine generate the populated template as if the dummy template engine were the original template engine, wherein a web application is unaware that the dummy engine is not the original template engine, and has no knowledge that execution of the template engine occurs at the client and not at the servers, and wherein the web application is separate from the dummy engine and the original template engine.

9. The method of claim 8, wherein the accessing the dummy template engine by the application program in lieu of and no differently than the original template engine results in the populated template being generated at the client instead of at the servers.

10. The method of claim 8, wherein because the dummy template engine is accessed by the application program no differently than the original template engine, the client generates the populated template instead of the servers generating the populated template without the application program having to be redeveloped.

11. The method of claim 10, wherein the application program otherwise uses the original template engine to cause the populated template to be generated at the servers.

* * * * *